F. CAPDEVILA.
CONTROLLING DEVICE FOR AIRCRAFT AND THE LIKE.
APPLICATION FILED APR. 1, 1912.
1,190,374.
Patented July 11, 1916.
2 SHEETS—SHEET 1.
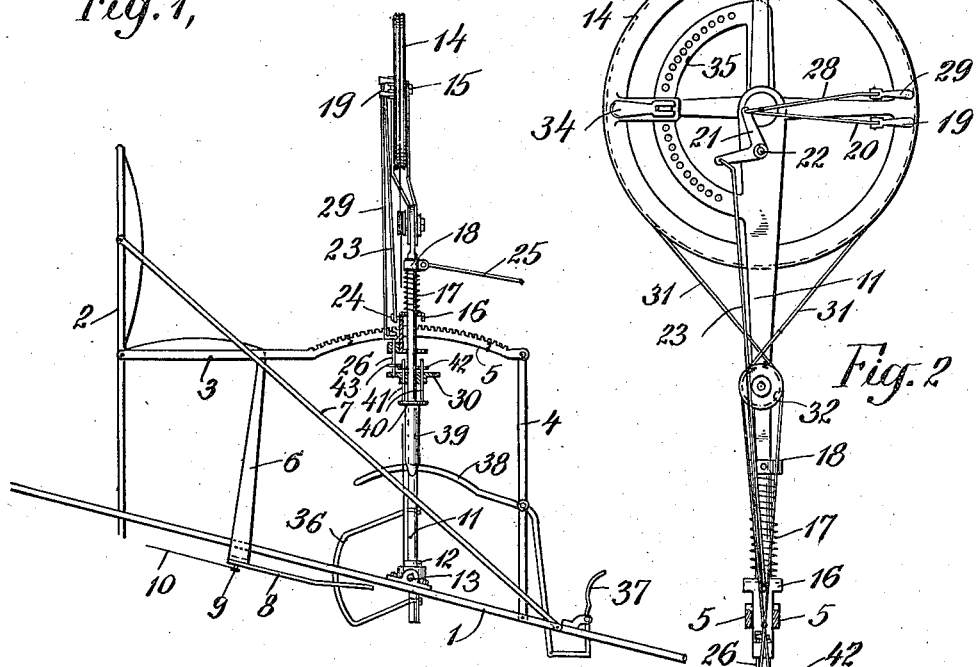
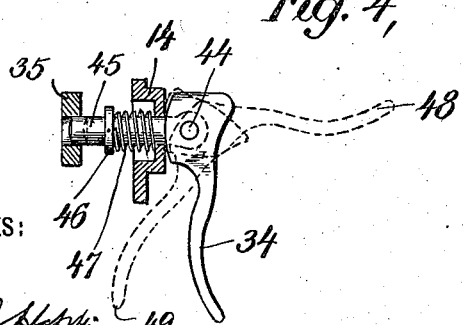
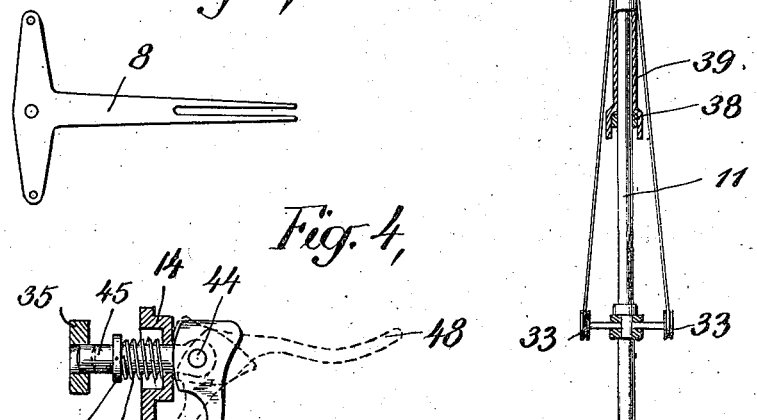
WITNESSES:
INVENTOR
Frank Capdevila
BY
ATTORNEYS

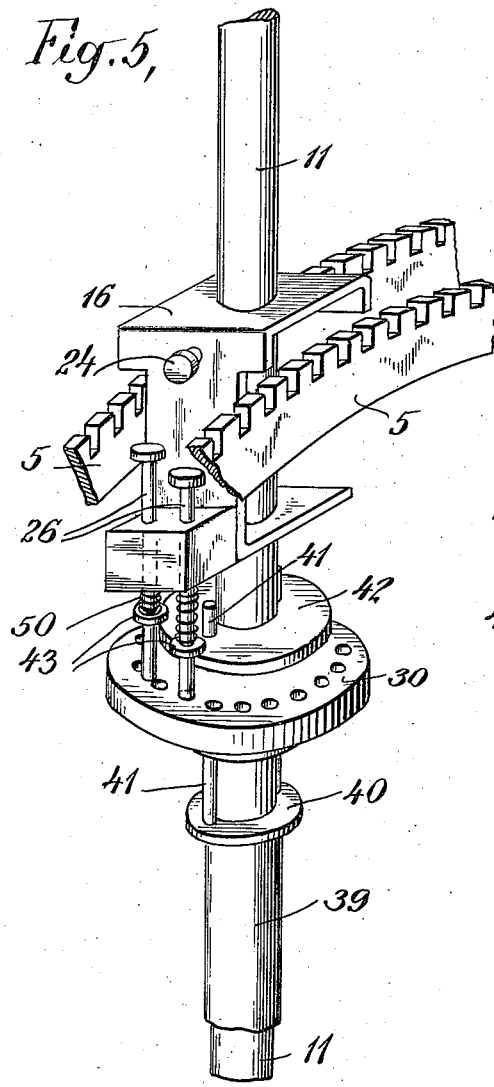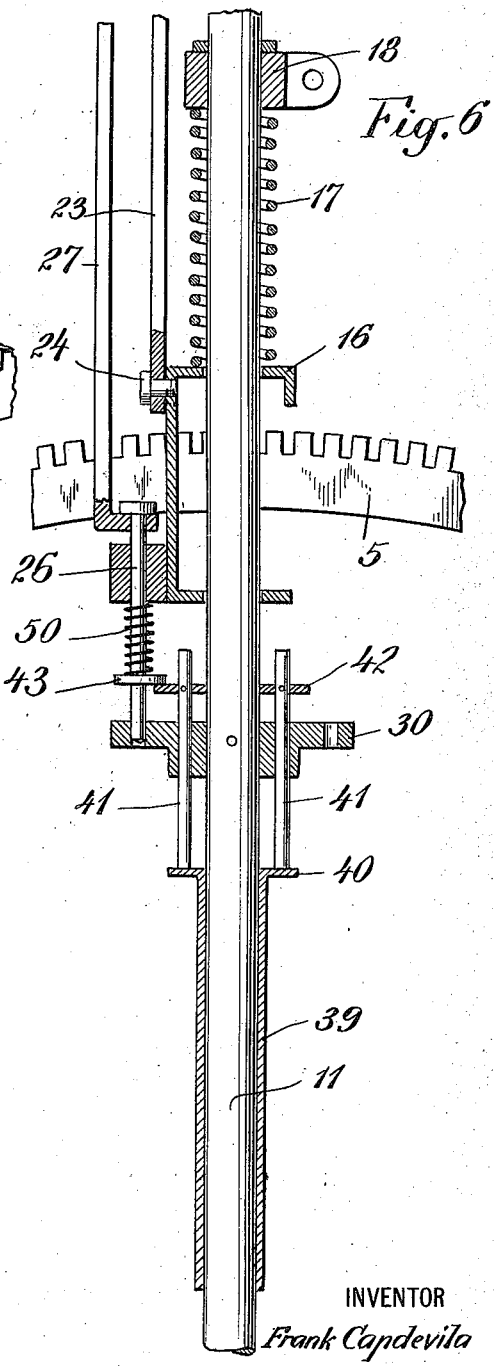

UNITED STATES PATENT OFFICE.

FRANK CAPDEVILA, OF NEW YORK, N. Y.

CONTROLLING DEVICE FOR AIRCRAFT AND THE LIKE.

1,190,374.  Specification of Letters Patent.  Patented July 11, 1916.

Application filed April 1, 1912. Serial No. 687,811.

*To all whom it may concern:*

Be it known that I, FRANK CAPDEVILA, a subject of the King of Spain, residing in the borough of Manhattan, city, county, and State of New York, have invented certain new and useful Improvements in Controlling Devices for Aircraft and the like; and I do hereby declare the following to be a full, clear, and exact description of the invention, such as will enable others skilled in the art to which it appertains to make and use the same.

My present invention relates to controlling apparatus for aeroplanes, dirigible balloons, hydroplanes and like vehicles and is more particularly directed to an appliance whereby the elevating planes, steering rudder and ailerons of aircraft may be actuated from a single tiller which admits of the positioning of any or all of the controlling surfaces by the operator when grasped by either hand or both hands and in which locking means, normally under the control of the operator, are provided to maintain the position to which any or all of the controlling surfaces have been set, permitting the operator the use of one or both hands when such is required or is desirable. The invention likewise contemplates the provision of means whereby the locking means may be instantly and automatically applied upon the accidental or intentional removal of the operator's hands from the tiller and an organization of these instrumentalities which will admit of one or more or all of them being rendered permanently or temporarily inoperative at the will of the operator.

My improved apparatus consists substantially in providing an upright tiller post pivoted for movement in a fore and aft direction and connected to the elevating planes to control the same by said movement, a tiller wheel mounted on said post to rotate in a transverse vertical plane thereon to effect the operation of the ailerons through suitable connections therewith and also serve as the grip for said post, a swivel mounting of said post and suitable connections whereby a rotative movement of said post about its longitudinal axis, effected by an angular movement of the tiller wheel with the post as an axis will position the steering rudder, and locking means for arresting when desired any or all of these movements, all as more particularly hereinafter described and set forth in the claims appended hereto.

I have illustrated an embodiment of my invention in which—

Figure 1, represents a side view of the tiller post and its position relative to the operator's seat; Fig. 2, is an elevation of the post and its attendant parts viewed from the operator's seat; Fig. 3, is a detail of the rudder operating lever; Fig. 4, is an enlarged detail, partly in section, of the bolt operating device employed for locking the tiller wheel; Fig. 5, is an enlarged view in perspective, of the locking device by which the movements of the post are arrested; and Fig. 6, is a fore and aft central vertical section through the mechanism shown in Fig. 5.

Referring to the drawings, and calling particular attention to Fig. 1, the apparatus is shown mounted upon downwardly slanting reaches 1 of an aeroplane. Upon these reaches uprights 2 and 4 support two parallel bars 3 which together with braces 6 and 7 form the framework of the seat. The braces 6 supporting the front edge of the seat are made in one piece bent under the reaches 1 and a slotted lever 8 is pivoted at 9 to the cross portion of the support 6. The lever 8 has a T-cross-piece to the ends of which wires 10 are attached. The wires 10 lead to the steering rudder of the aeroplane and this rudder is operated when the lever 8 is turned about its pivot. The end portions of the bars 3 are shaped to the arc of a circle and provided with teeth to form the arc-shaped racks 5. A tiller post 11 is supported in a journal in a cross-piece which is pivoted in pillow blocks 13 on the reaches 1 and is thus capable of being turned upon its longitudinal axis and inclined about the axis journaled in pillow blocks 13. The post 11 is mounted between the two parallel bars 3 and the arc-shaped racks 5 of the bars 3. The curve of these racks 5 is struck upon the center of the pillow blocks 13. A collar 12 upon the post 11 supports the post 11 in its journal and a like collar on said post below its journal, and not shown, prevents the upward movement of the post in its journal. A hand-wheel 14 is mounted to turn upon a stud 15 upon the upper end of the post 11 and when this wheel is grasped by the operator occupying the seat of the machine he is enabled to incline the post toward or from him, turn the post about its longitudinal axis and turn the wheel 14 upon its pivot 15, without removing his hands from the wheel. The fore and aft inclination of the post is made use of to operate the elevating planes of the aeroplane, these planes being connected by a rod 25 with a swivel collar 18 upon the post 11. The angular movement of the post upon its longitudinal axis is made use of to operate the steering rudder, a rod 36 securely fastened to the post 11 and bent in the form of an arc stuck about the center of the pillow blocks 13 engaging the slot in the rudder operating lever 8. The rod 36 is bent to an arc of sufficient length to maintain engagement with the lever 8 in any position to which the post 11 may be inclined. The rotation of the wheel 14 upon the post 11 is made use of to operate the ailerons or equivalent stabilizing devices, wires or cables 31 laid in a groove in the periphery of the wheel 14 and securely fastened to the wheel being led about pulleys 32 and 33 to operative connection with the ailerons. I prefer to cross the cables 31 between the racks 5, this being a convenient and compact arrangement of the device.

I have provided locking devices for each of the movements of the control to permit the operator to lock the elevating and steering rudders and the ailerons in any desired position to which they may have been set either severally or together. The locking means provided for fixing the ailerons in any position consists of the handle 34 mounted on the steering wheel 14 in a position convenient to the left hand of the operator. This lever 34 shown in detail in Fig. 4 is pivoted at 44 to a bolt 45, the bolt 45 being mounted in an arm of the wheel 14. A spring 47 normally presses against the under-side of the arm of the wheel and against a collar on the bolt 45 tending to cause the bolt 45 to enter one of a series of holes, in a segment 35 on the post 11 securely locking the wheel 14 against rotation. The pressure of the operator's hand upon the handle 34 while grasping the wheel 14 will move the handle 34 to the position 49 shown in Fig. 4, and a cam surface on the under-side of the handle 34 will withdraw the bolt 45 from the holes in segment 35 and permit the wheel 14 to be rotated and the ailerons thereby actuated. If owing to design or accident the operator should remove his hand from the wheel 14 removing the pressure from the handle 34, the wheel 14 will be automatically locked to the post and the ailerons will remain in the position to which they were last set. If this automatic action of the locking device for any reason is not desired the handle 34 may be placed in the position 48 (see Fig. 4) and the flat end of the handle 34 resting upon the arm of the wheel will maintain the bolt 45 in its withdrawn position and the wheel 14 will remain unlocked even though the operator may remove his hands therefrom.

The locking device for the elevating planes which must control the forward and backward inclination of the post 11, consists of a bent piece 16 mounted upon the post 11 which bent piece 16 has teeth which are normally caused by spring 17 to engage the teeth upon the racks 5 thus locking the post 11 against inclination. The spring 17 bears upon the upper surface of the bent piece 16 and upon the under-surface of the collar 18. A rod 23 connected at 24 to the bent piece 16 is pivoted to one arm of one of two bell crank levers 21 pivoted upon the post 11 adjacent the center of the wheel 14. A rod 20 pivoted to the other arm of said bell crank is connected to a handle 19 of substantially the same construction and arrangement as the handle 34 and which serves when depressed or when thrown to the position 48 shown in Fig. 4 to pull upon the rod 20 and release the bent piece 16 from engagement with the racks 5. In the case of the handle 19 the cam surfaces of the handle work in opposition to the spring 17 to withdraw the bent piece from engagement with its rack. In the manner just described, the post 11 may be released from locking engagement with the racks 5 by the pressure of the right hand of the operator while grasping the wheel 14 and if he should release his grasp on the wheel by accident the post 11 would be automatically locked in the position to which it was last placed and the elevating planes would remain immovable. Like the locking means provided for the wheel 14, the handle 19 may be thrown to an inoperative position when desired. It will be seen that the locking device described, by which the post 11 is locked against inclination forward and backward, does not interfere with the angular movement of the post about its longitudinal axis.

The means provided for locking the post 11 against angular movement about its longitudinal axis and thereby locking the steering rudder in the position to which it was last put, consists of two pins 26 mounted in a projection from the bent piece 16 and designed to engage with a circular series of holes in a disk 30 fast upon the post 11. I prefer to use two of these pins 26 arranged at such a distance apart that while one is engaging a hole of the circular series the other will be midway between two holes. By this arrangement twice as many locking positions are afforded. The pins 26 are of such length that the bent piece 16 may be raised from or dropped into the teeth of the racks 5 without disturbing them and they may be raised out of or dropped into engagement with the circular series of holes in the disk 30 while the bent piece 16 is in either of its positions. Springs 50 upon the pins 26 abutting the under-side of the projection upon the bent piece 16 bear against collars 43 upon the pins 26 and normally tend to engage one or the other of the pins with the holes in the disk 30. A rod 27 is bent at its lower end and provided with holes in the bent portion in which the pins 26 may slide, and this bent portion is adapted to lift the pins by engagement with their heads when the rod 27 is raised. The upper end of the rod 27 is pivoted to one arm of the second of the bell crank levers 21 and a rod 28 is pivoted to the other arm of this bell crank lever and to a handle 29 in every respect similar to the handle 19. It will be seen that by pressure upon the handle 29 by the hand of the operator in grasping the wheel 14 the pins 26 may be raised out of engagement with the holes in the disk 30 and the post 11 turned about its longitudinal axis to effect the movement of the steering rudder and that should the operator release his hold by accident upon this handle the steering rudder would be locked instantly. The handles 19 and 29 are placed conveniently so that the operator may depress either one or the other or both by grasping the wheel 14 and thereby release either the elevating planes or the steering rudder. Both handles 19 and 29 may be placed in the position 48 shown in Fig. 4 and the locking devices rendered inoperative.

In order to provide for the contingency when the operator may wish to momentarily use his right hand for other purposes than control and does not wish to eliminate the automatic locking features of the elevating and steering controls by placing the handles 19 and 29 in the position 48, I have provided a foot pedal 37 pivoted on the reach 1 and operating a lever 38 to lift a sleeve 39 on the post 11. The sleeve 39 is provided at its upper end with a flange 40 which is adapted to raise two pins 41 slidably mounted in the disk 30 within the circle of the series of holes in said disk. The pins 41 are secured fast to a washer 42, the edge of which is adapted to abut the under-sides of the collars 43 on the pins 26, and raise the pins 26 when the pins 41 are raised by the sleeve 39. The upper ends of the pins 41 are adapted to contact with the bent piece 16 and raise it out of contact with the racks 5. Thus it will be seen that the pressure of the operator's foot upon the pedal 37 will release both the elevating planes and the steering rudder while his right hand may be otherwise engaged, and in case of accident the removal of the foot from the pedal 37 will permit the locking devices to automatically reassume their locking positions.

Having thus described my invention what I claim is:

1. In a controlling device of the character described the combination with a tiller post mounted for angular movement about its longitudinal axis and for inclination about an axis transverse to its longitudinal axis, of a spring actuated latch swinging with said post about its transverse axis and adapted to automatically lock said post against angular movement about its longitudinal axis the while admitting of its inclination about said transverse axis; and hand operated means near the top of said tiller post for controlling said latch; substantially as and for the purposes set forth.

2. In a controlling device of the character described the combination with a tiller post mounted for angular movement about its longitudinal axis and for inclination about an axis transverse to its longitudinal axis, of a hand actuated latch adapted to automatically lock said post against angular movement about its longitudinal axis the while admitting of its inclination and a second latch adapted to automatically lock said post against inclination about said transverse axis the while admitting of its angular movement about its longitudinal axis, said latches being independent of one another and severally or simultaneously actuatable by hand from near the top of said tiller post and swinging with said post when it is inclined about said transverse axis; substantially as and for the purposes set forth.

3. In a controlling device of the character described, the combination with a tiller post mounted for angular movement about its longitudinal axis and inclination about a transverse axis, of a wheel mounted for rotation on said post in a plane substantially parallel to said longitudinal axis of said post, a locking device swinging with said post and capable of preventing the angular movement of said post about its longitudinal axis, a second locking device swinging with said post and capable of preventing the inclination of said post about said transverse axis and a third locking device rotating with said wheel and capable of preventing the rotation of said wheel on said post; all of said locking devices being hand operated from near the top of the tiller post; substantially as and for the purposes set forth.

4. In a controlling device of the character described, the combination with an operating member adapted to be grasped by the operator, of an automatic locking device for said operating member, of a handle mounted on said operating member in a position admitting of its being grasped therewith, said handle being operatively connected with said locking device and designed to assume a normal locking position, a second position wherein it releases said locking device and from which it will automatically reassume said normal position and a third position wherein it releases said locking device and resists return to said normal position; substantially as and for the purposes set forth.

5. In a controlling device of the character described, the combination with an operating member capable of movement by hand in two or more directions, of a plurality of automatic locking devices all swinging with said member and each normally adapted to lock said member against movement in one of said directions, while permitting movement in another direction, and all of said locking devices having control mechanism within reach of the operator's hands while said movements of the operating member are being made.

6. In a controlling device of the character described, the combination with an operating member capable of movement in two or more directions, of a plurality of locking devices each of which is adapted to lock said member against movement in one of said directions and to be set to an operative position from which it will automatically return to a locking position and a second inoperative position from which it will not automatically return to its locking position; substantially as and for the purposes set forth.

7. In a controlling device of the character described, the combination with a tiller post mounted for angular movement about its longitudinal axis and inclination about a transverse axis, of a wheel mounted for rotation on said post in a plane substantially parallel to said longitudinal axis of said post, a locking device normally preventing the angular movement of said post about its longitudinal axis and adapted to be set to an operative position to which it will automatically return after release and to an inert released position, a second locking device normally preventing the inclination of said post about said transverse axis and adapted to be set to an operative position to which it will automatically return after release and to an inert released position, and a third locking device normally preventing the rotation of said wheel on said post and adapted to be set to an operative position to which it will automatically return after release and to an inert released position said locking devices being mounted to swing with said tiller post about said transverse axis; substantially as and for the purposes set forth.

8. In a controlling device of the character described, the combination with a tiller post mounted for angular movement about its longitudinal axis and for inclination about an axis transverse to its longitudinal axis, of a locking device adapted to lock said post against angular movement about its longitudinal axis the while admitting of its inclination, a second locking device adapted to lock said post against inclination about said transverse axis the while admitting of its angular movement about its longitudinal axis, said locking devices being independent of one another and severally or simultaneously actuable, and a pedal mounted to engage and release said locking devices; substantially as described.

9. In a controlling device of the character described, the combination with an operating member adapted to be grasped by the operator, of an automatic locking device for said operating member, of a handle mounted on said operating member in a position admitting of its being grasped therewith, said handle being operatively connected with said locking device and designed to assume a normal locking position, a second position wherein it releases said locking device and from which it will automatically reassume said normal position, a third position wherein it releases said locking device and resists return to said normal position, and a pedal mounted for engagement with and to release said locking device when depressed by the foot and permit of the automatic locking of said locking device when relieved; substantially as described.

10. In a controlling device of the character described, the combination with an operating member capable of movement in two directions, of a plurality of locking devices each of which is adapted to lock said member against movement in one of said directions and to be set to an operative position from which it will automatically return to a locking position, a second inoperative position from which it will not automatically return to its locking position, and a pedal mounted for engagement with and to release said locking devices when depressed by the foot and permit of the automatic locking of said locking devices when relieved; substantially as described.

In testimony whereof I affix my signature, in presence of two witnesses.

FRANK CAPDEVILA.

Witnesses:
  MARCUS C. HOPKINS,
  MINERVA LOHEL.